July 12, 1927.
J. C. POTH
1,635,905
END GATE
Filed Nov. 17, 1925
3 Sheets-Sheet 1
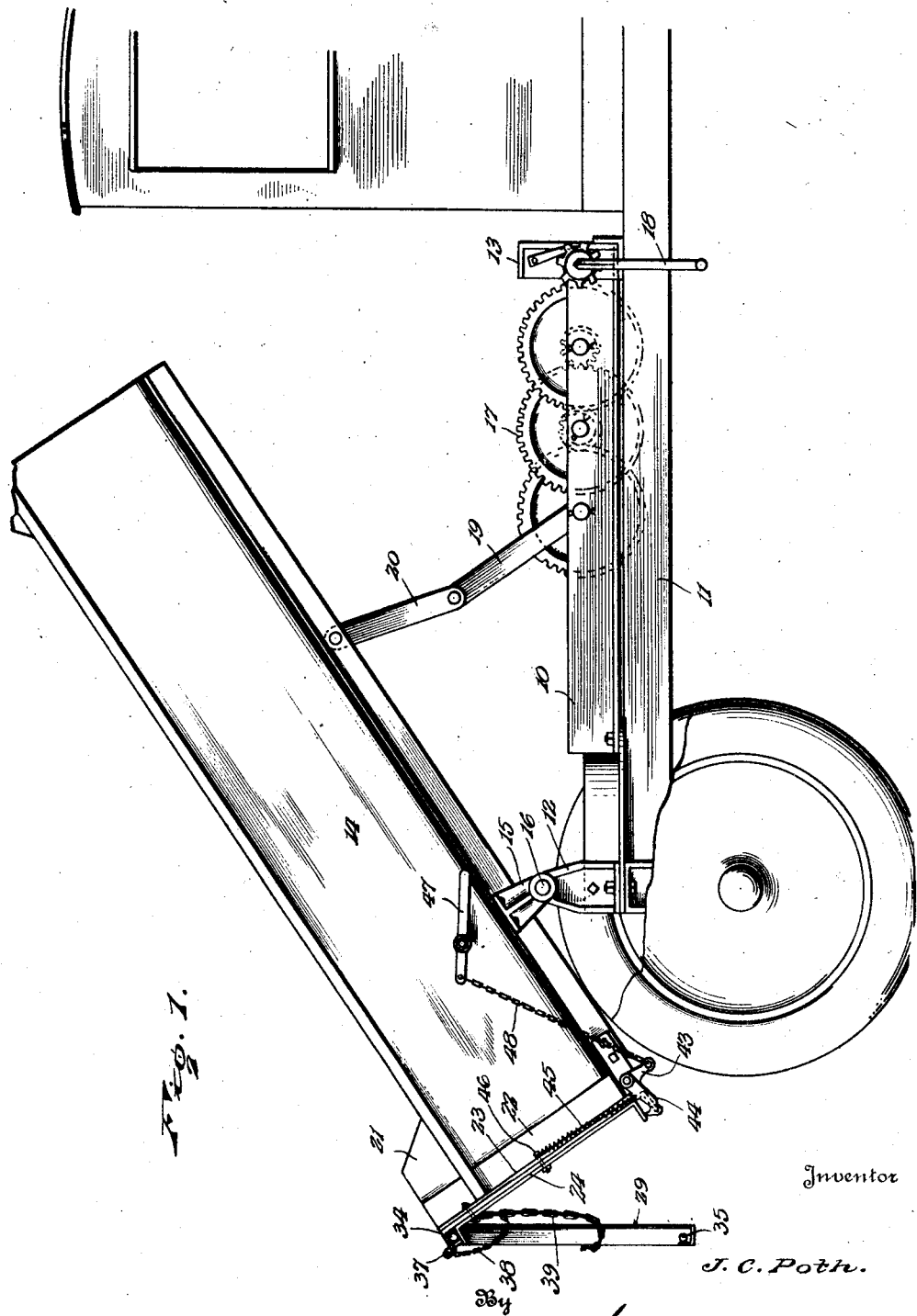

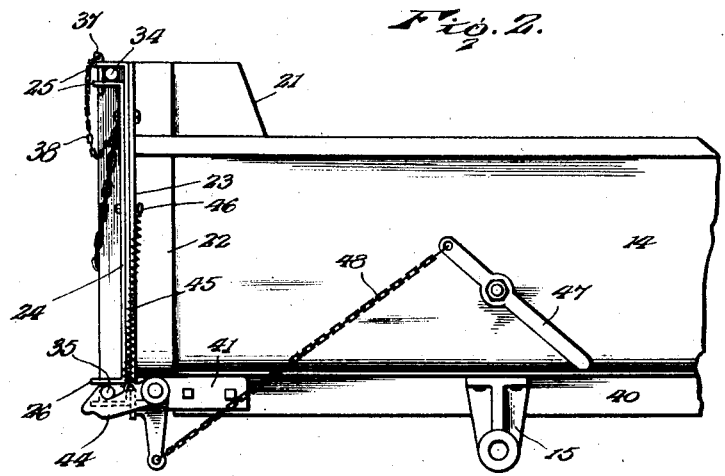
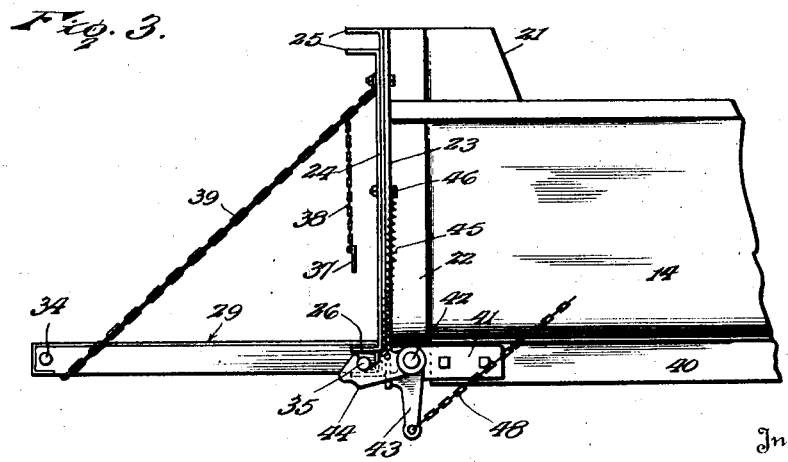

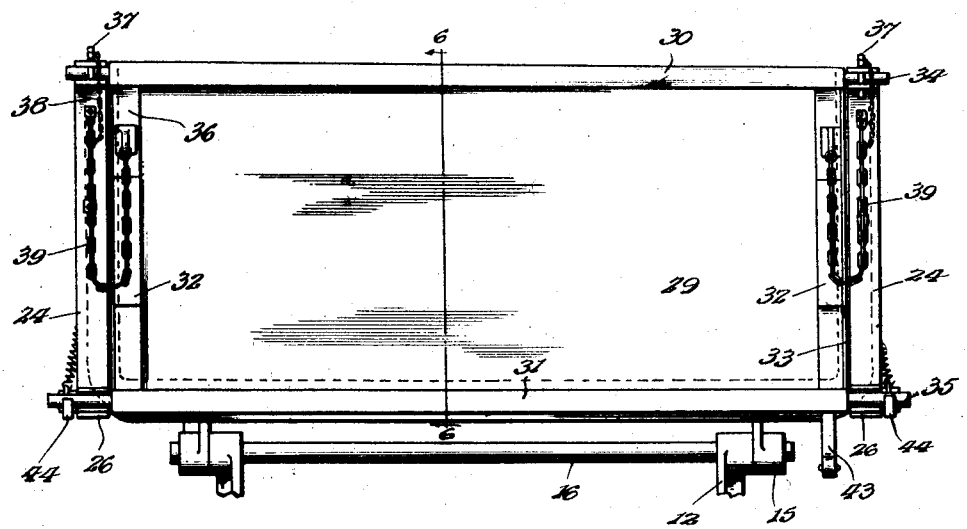
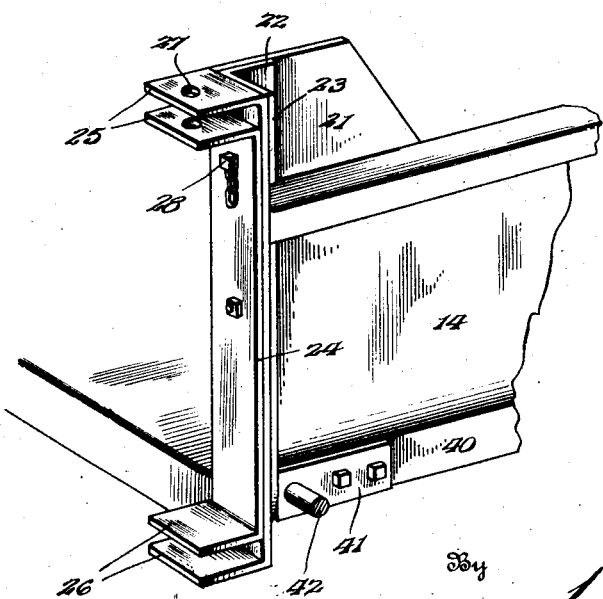
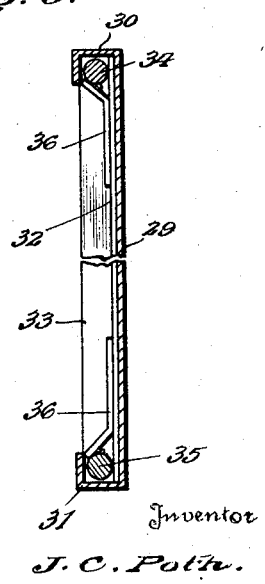

Patented July 12, 1927.

1,635,905

UNITED STATES PATENT OFFICE.

JOHN C. POTH, OF GALION, OHIO, ASSIGNOR TO PERFECTION STEEL BODY CO., OF GALION, OHIO, A CORPORATION OF OHIO.

END GATE.

Application filed November 17, 1925. Serial No. 69,665.

This invention relates to an improved end gate for dumping truck bodies, being particularly designed for use in connection with my improved dumping unit disclosed in my copending application filed December 2, 1925, Ser. No. 72,745.

The invention seeks, among other objects, to provide a novel mounting for the end gate, and wherein the gate may be swung open at the bottom thereof or may be swung downwardly to a position lying flush with the bottom wall of the body.

A further object of the invention is to provide a construction wherein the end gate will normally be latched closed, and wherein the latches employed will serve as keepers for the lower pivot rod of the gate when said gate is swung downwardly.

And the invention seeks, as a still further object, to provide a hand lever for disengaging the latches so that the end gate may swing open at the bottom thereof, and wherein said lever will be located in such a position that the person operating the tilting mechanism for the body may readily reach said lever for releasing the end gate.

Other and incidental objects of the invention not specifically above mentioned, will appear as the description proceeds.

In the accompanying drawings:

Figure 1 is a side elevation showing the end gate of the present invention in connection with my improved dumping unit as disclosed in my co-pending application previously identified.

Figure 2 is a detail side elevation showing the gate closed.

Figure 3 is a view similar to Figure 2, but showing the gate swung down to extend flush with the bottom wall of the truck body.

Figure 4 is a rear elevation showing the gate closed.

Figure 5 is a detail perspective view showing one of the bearing brackets for the end gate.

Figure 6 is a vertical sectional view on the line 6—6 of Figure 4, looking in the direction indicated by the arrows and showing the mounting of the upper and lower pivot rods of the gate.

In the drawings, I have shown the present end gate in connection with my improved dumping unit for motor trucks, as previously noted, and in order that the operation of the end gate may be better understood, I shall generally describe said unit. A base frame, indicated as a whole at 10, is employed. This base frame is fixed to the frame of a truck chassis, as conventionally illustrated at 11, and upstanding from said base frame at its rear end are brackets 12 while at the forward end of the base frame are upstanding rests 13. Supported on the base frame is a sheet metal body 14 normally seated at its forward end upon the rests 13 and fixed to the body near its rear end are brackets 15 mating with the brackets 12 to receive a cross rod 16 pivotally mounting the body. Mounted at the forward end portion of the base frame is a train of gears indicated generally at 17. This train of gears is operable by a hand crank 18, and fixed to one of said gears are arms 19 connected with the body 14 by links 20. Thus, the hand crank may be operated for turning the gears 17 and swinging the arms 19 upwardly, as shown in Figure 1, for tilting the body and dumping the load.

In accordance with the present invention, the side walls of the body are equipped at their ends with upstanding end plates 21 welded or otherwise secured to said walls, and similarly secured to said walls and to said plates at the outer sides thereof are vertical angle bars 22, the laterally directed flanges 23 of which lie flush with the rear end edges of the body. Fixed to the flanges 23 of said bars, as best seen in Figure 5, are double-ended bearing brackets 24 which are preferably welded to the flanges. The brackets 24 are each formed of a pair of flat overlapping bars which are welded together and are bent near their ends to form an upper pair of spaced parallel lugs 25 defining a yoke shaped bearing at the upper end of the bracket, and are likewise bent near their lower ends to form a similar pair of spaced parallel lugs 26 forming a yoke-shaped bearing at the lower end of the bracket. The upper pairs of lugs 25 of the brackets are provided with alined openings 27 and reinforcing the welded connections between the flanges 23 of the bars 22 and said brackets are bolts 28 or other fastening devices.

Mounted upon the brackets 24 is a gate 29 adapted to close the body 14 at its rear end. This gate is preferably of sheet metal and is bent over at its longitudinal margins to form upper and lower channels 30 and 31 respectively. Welded or otherwise fixed to the ends of the gate are vertical angle bars 32, the flanges 33 of which, as best seen in Figure 6, extend across the ends of the channels 30 and 31 and, of course, said bars serve to brace and reinforce the gate at its ends. Lying within the upper channel 30 is a pivot rod 34, the projecting ends of which form trunnions which are freely received between the lugs 25 of the bearings at the upper ends of the brackets 24, and lying within the lower channel 31 is a similar pivot rod 35, the projecting ends of which form trunnions which are freely received between the lugs 26 of the bearings at the lower ends of said brackets. The pivot rods extend through the flanges 33 of the bars 32, and welded to said bars are retaining plates 36 which are also welded to the rods for securing said rods against endwise displacement. Removably engaging through the openings 27 of the lugs 25 of the upper bearings of the brackets 24 are pins 37 limiting the upper pivot rod 34 against displacement from said bearings, and flexibly anchoring said pins are chains or like elements 38. Thus, as will be seen, the rod 34 will support the gate 29 to swing open at the bottom thereof. Extending between the bolts 28 and the gate are chains or like elements 39 appropriately secured to the gate near the upper longitudinal edge thereof, and, as will be observed, the chains 38 of the pins 37 are preferably attached to the chains 39.

Fixed to the bottom wall of the body are spaced longitudinally extending reinforcing bars 40, and bolted or otherwise secured to said bars at their rear ends, are rearwardly projecting plates 41. Journaled through said plates is a shaft 42 carrying a depending lever 43, and fixed to the ends of said shaft are latches 44. Secured to said latches are springs 45 which are anchored to bolts 46 so that the springs will thus function to swing the latches upwardly, and, as shown in Figures 2 and 4, the latches 44 are disposed to engage the ends of the pivot rod 25 of the end gate for securing the gate closed. Swingingly mounted upon the adjacent side wall of the body 14, near the rear end thereof, is a hand lever 47, and extending between one end of said lever and the lever 43 is a chain or like element 48. The lever is pivoted near its upper end so that the lower end portion of the lever will provide a counterweight tending to hold the chain taut.

As will now be seen, the crank 18 may, as previously described, be operated for tilting the body, as shown in Figure 1, when the lever 47 may be swung for rocking the shaft 42 and disengaging the latches 43 from the ends of the rod 35 of the end gate 29, when said gate will swing open at the bottom thereof to permit the discharge of the load. Thus, the load may be readily dumped and by mounting the lever 47 at the adjacent side of the body, said lever is located in a position conveniently accessible to the operator. When the body is then subsequently lowered, the end gate will, of course, again swing to closed position to be secured by the latches 44.

For certain purposes, it is desirable to have the end gate swing open from the top thereof, in the manner illustrated in Figure 3. In such instance, the pins 37 are removed from the openings 27 of the lugs 25 of the upper bearings of the brackets 24, when, as shown, the end gate may be swung down to be supported by the chains 39 flush with the bottom wall of the body 14. When the gate is thus opened, the pivot rod 35 will, of course, coact with the lower bearings of the brackets 24 to swingingly support the gate while the latches 44 will coact with the rod for retaining the ends thereof between the lugs 26 of said bearings.

Having thus described the invention, what I claim is:

1. In combination with a body, of a pivoted end gate therefor having an edge portion bent to provide a channel, a pivot rod located in the channel, angle bars reenforcing the end portions of the gate and closing the open ends of the said channel, and retainers carried by the angle bars and extending across the open side of the channel and in contact with the said pivot rod to hold it in place.

2. In combination with a body, of a sheet metal end gate therefor, having upper and lower marginal portions bent to provide channels, a pivot rod in each of the channels, angle bars reenforcing end portions of the gate and extending across the open ends of the channels, and retainers at the ends of the angle bars extending across the open sides of the channels and in contact with the respective pivot rods to hold them in place.

In testimony whereof I affix my signature.

JOHN C. POTH. [L. S.]